United States Patent
Dhebri et al.

(10) Patent No.: US 8,195,131 B2
(45) Date of Patent: Jun. 5, 2012

(54) REPLYING TO AN SMS BROADCAST MESSAGE

(75) Inventors: Pratik Mahesh Dhebri, San Diego, CA (US); Hai Qu, San Diego, CA (US); Rex Chen, Cerritos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1191 days.

(21) Appl. No.: 11/361,424

(22) Filed: Feb. 24, 2006

(65) Prior Publication Data

US 2007/0202894 A1 Aug. 30, 2007

(51) Int. Cl.
*H04M 11/10* (2006.01)
*H04W 4/00* (2009.01)
*G06F 15/16* (2006.01)

(52) U.S. Cl. .................. 455/413; 455/466; 709/227
(58) Field of Classification Search .................. 455/413, 455/466; 709/227
See application file for complete search history.

(56) References Cited

U.S. PATENT DOCUMENTS

| 6,522,877 B1 * | 2/2003 | Lietsalmi et al. ........... 455/422.1 |
| 2001/0028709 A1 * | 10/2001 | Makela et al. ........... 379/214.01 |
| 2004/0127263 A1 * | 7/2004 | Vegh ............................. 455/567 |
| 2005/0223368 A1 * | 10/2005 | Smith et al. .................... 717/128 |
| 2007/0046823 A1 * | 3/2007 | Jiang ............................. 348/582 |
| 2007/0150339 A1 * | 6/2007 | Retter et al. .................... 705/14 |

FOREIGN PATENT DOCUMENTS

| WO | WO 2005001623 A2 * | 1/2005 |
| WO | WO 2006022513 A1 * | 3/2006 |

* cited by examiner

*Primary Examiner* — Un C Cho
*Assistant Examiner* — Jing Gao
(74) *Attorney, Agent, or Firm* — James T. Hagler

(57) ABSTRACT

A method includes receiving a broadcast message at a receiver device. The message includes identification information identifying a message-type associated with the message, reply-to information, and user information. The method further includes determining the received message is a broadcast message based on the message-type of the message and determining the message includes the reply-to information describing a reply-to address. The method additionally includes passing the user information contained within the message to a user interface when the message is a broadcast message including reply-to information and receiving an instruction from the user interface. The instruction is based on the user information and user input responsive to the user information. The method further includes producing and sending a reply message addressed to the reply-to address responsive to the instruction.

20 Claims, 4 Drawing Sheets

REPLYING TO AN SMS BROADCAST MESSAGE

BACKGROUND OF THE INVENTION

1. Technical Field

The invention relates generally to the field of wireless data transmission, and more particularly to data transmission in mobile devices.

2. Background Discussion

Mobile devices today are capable of performing many tasks. Conventional mobile devices include the capability of sending data and receiving data at the device, such as text messaging, email, and web browsing. Conventional mobile devices operate within a cellular network. Typically, a cellular network includes a Short Message Service (SMS) cell broadcast service as well as one-to-one messaging and one-to-few messaging capabilities. The SMS cell broadcast service provides an efficient way for the network to propagate/broadcast information to a particular cell broadcast area. The network accomplishes this SMS cell broadcast communication of information by broadcasting a single message to any receivers able to receive a communication from the network that are within the geographic area that the footprint of the cell covers. In other words, SMS cell broadcast is designed for simultaneous delivery of messages to multiple users in a specified area. Whereas conventional SMS is a one-to-one and one-to-few service, cell broadcast is one-to-many geographically-focused service. Cell broadcast enables messages to be communicated to multiple mobile phone customers who are located within a given part of its network coverage area at the time the message is broadcast.

Communicating with specific groups of mobile devices operating within a cellular network using an SMS cell broadcast service has proven to be a difficult. For example, broadcast messaging floods the cell with a broadcast message and results in all mobile devices receiving the broadcast message whether the users of the mobile devices wanted to receive the broadcast message or not. Typically, vendors use point-to-point SMS messaging to reach the mobile devices of users who have subscribed to the vendor's services. In such an example, a vendor can send a promotional offer to a user who is subscribed to the vendors service notifying them of a special promotional offering. The user of the mobile device that received the offer can easily reply to the message containing the offer as the message is a point-to-point SMS message that includes the origination address embedded within the message.

Unfortunately, the use of point-to-point SMS messaging within a network is not an efficient use of the network's resources (e.g., bandwidth) as point-to-point SMS messaging generates more traffic and network congestion with the use of individual SMS messages.

A superior cell broadcast mechanism and technique have eluded those skilled in the art, until now.

SUMMARY OF THE INVENTION

The invention is directed to a receiving and replying to a broadcast message within a communication system. Briefly stated, the present invention is directed to managing a received broadcast message that includes reply-to information and providing a reply message in a mobile device environment.

In one aspect, a method for receiving and replying to a broadcast message within a communication system is provided. The method includes receiving a signal that includes a message at a receiver device. The message includes identification information identifying a message-type associated with the message, reply-to information, and user information. The method further includes determining the received message is a broadcast message based on the message-type of the message and determining the message includes the reply-to information describing a reply-to address. The method additionally includes passing the user information contained within the message to a user interface when the message is a broadcast message including reply-to information and receiving an instruction from the user interface. The instruction is based on the user information and user input responsive to the user information. The method further includes producing a reply message addressed to the reply-to address responsive to the instruction. The reply message includes user input to be communicated to the reply-to address. The method additionally includes sending the reply message to the reply-to address.

In another aspect, a method for sending a broadcast message and receiving a reply to the broadcast message within a communication system is provided. The method includes sending a signal including a broadcast message from a communication component to a receiving device within the communication system. The message includes identification information identifying the message as a broadcast message, reply-to information describing a reply-to address, and user information. The method further includes receiving a reply message addressed to the reply-to address at the communication component. The reply message includes a reply based on user input responsive to the user information.

In yet another aspect, a memory for storing data for access by an application program being executed on a data processing system is provided. The memory includes a first data structure stored in said memory. The first data structure includes information resident in a database used by said application program. The first data structure includes a plurality of data fields stored in said memory wherein each of the said data fields contains different information from said database. The data fields include: a service identification field that identifies the first data structure as a broadcast message; a payload field that includes user data; and a reply-to field that includes data for producing a second data structure wherein the reply-to field includes information describing a reply-to address.

In another aspect, a computer-readable medium encoded with computer-readable components is provided. The computer-readable components include: a message queue configured for storing received broadcast messages and reply messages; an SMS engine that is configured to receive messages and determine whether each received message is a broadcast message by determining whether a message service identifier indicating the message is a broadcast message is associated with the message, the SMS engine is further configured to store the received messages at the message queue when the message is a broadcast message, the SMS engine is additionally configured to retrieve reply messages from the message queue and facilitate transmission of the reply messages; a stored settings database including user settings; a user interface configured to format & present user information to a user; and a broadcast message engine, the broadcast message engine is configured to retrieve the stored broadcast message and the stored user settings, the broadcast message engine is further configured to determine whether to pass the user information to the user interface based on the contents of the broadcast message and the user settings, the broadcast message engine is additionally configured to receive instructions from the user interface for producing a reply message based on user interaction with the user interface and the contents of the broadcast message wherein the contents of the broadcast message include at least a reply-to address, the broadcast message engine is further configured to store the reply message at the message queue.

DETAILED DESCRIPTION

What follows is a detailed description of various techniques and mechanisms for wireless data transmission. Very generally stated, the present invention is directed to providing two-way selective communication within a radio broadcast infrastructure. In certain implementations, the present invention uses the structure of an SMS Cell Broadcast message having at least a header and a payload to embed a service identification (ID) field and a reply field within the header. The service ID field identifies the message as a broadcast message, and the reply field specifies an address to which a reply may be delivered.

Figure 1:
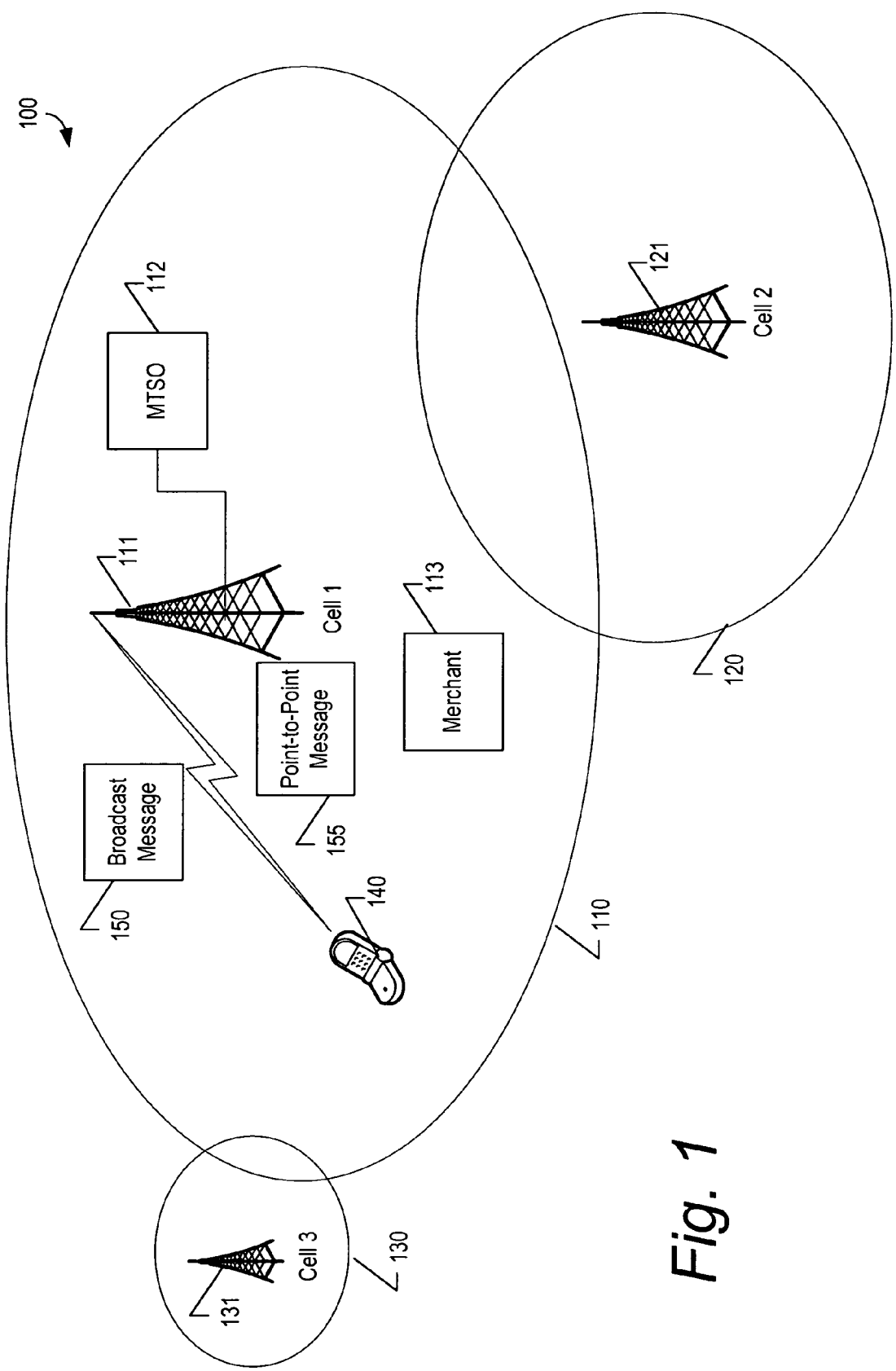
FIG. 1 is a functional block diagram generally illustrating a communication system in which implementations of the invention are particularly applicable.

FIG. 1 is a functional block diagram generally illustrating a communication system 100 in which implementations of the invention are particularly applicable. Communication system 100 is a cellular communication network for transmitting and receiving voice and/or data communication to mobile devices. Communication system 100, as shown, includes three cells, cell 1 (110), cell 2 (120, and cell 3 (130). Each cell is a subordinate two-way communication network of communication system 100 for facilitating communications within an associated bounded geographic area. Each cell includes hardware, such as a tower 111, 121, and 131 and software to facilitate two-way communication within the associated bounded geographic area. Each cell is coupled to the other cells to facilitate communication between a mobile device in one cell and other devices, such as other mobile devices in the same or another cell, or wired devices on the Public Switched Telephone Network (PSTN).

Communication system 100 additionally includes a mobile telephone switching office (MTSO) 112, for example located within cell 1 (110). In other embodiments, the MTSO may be located elsewhere within communication system 100. The MTSO is a central switch that controls the operation of a cellular sub-system. In one embodiment, the MTSO is implemented as a sophisticated computer system that monitors cellular calls, tracks the location of cellular devices (e.g. cellular-equipped vehicles, hand-carried mobile phones or cellular-equipped PDA devices, etc.) stationary or traveling in the system, arranges handoffs (e.g., between cells within the system), keeps track of billing information, and the like.

Communication system 100 also includes a mobile device 140, such as a cellular telephone. Mobile device 140 is a two-way telecommunications device that is compatible with communication system 100 and, as illustrated, is currently operating within cell 1 (110) of communication system 100. Mobile device 140 is configured for two-way communication including voice communication as well as SMS Cell Broadcast Service operation within communication system 100. One particular embodiment of mobile device 140 is illustrated in further detail in FIG. 4 and described below.

Communication system 100 further includes a broadcast message 150. The broadcast message 150, in accordance with one embodiment of the invention, is an SMS broadcast message that includes reply-to information sufficient to enable a receiving device (e.g., mobile device 140) to transmit a reply message (not shown). One particular embodiment of broadcast message 150 is illustrated in further detail in FIG. 2 and described below. Communication system 100 may further include a point-to-point message 155, which may be a conventional message used within communication system 100 to allow one sender to communicate with one receiver, such as an ordinary text message.

A merchant 113 represents an entity or individual that has commissioned or requested the sending of broadcast message 150. For example, the merchant 113 may be providing an advertisement or promotion intended for delivery using the SMS Cell Broadcast System. This advertisement or promotion may become the subject of the broadcast message 150.

In general operation, the MTSO 112 prepares and configures the broadcast message 150 for broadcast transmission to a particular geographic area, cell 1 (110) in this example. Accordingly, the MTSO 112 causes the cell 1 tower 111 to propagate the broadcast message 150. Any mobile device within cell 1 (110), such as mobile device 140, may receive the broadcast message 150.

When received, the user of the mobile device 140 may choose to reply to the broadcast message 150. If so, the mobile device 140 may construct a reply message (point-to-point message 155) addressed to a reply-to address provided in the broadcast message 150. The reply message is transmitted by the mobile device 140 to the tower 111 as a point-to-point message 155. The reply message is then processed by the MTSO 112. Alternatively, the mobile device 140 may initiate a voice call to a location specified in the broadcast message 150, make a connection to a location identified by a Universal Resource Locator (URL) or Universal Resource Identifier (URI) provided in the broadcast message 150, or the like.

Figure 2:
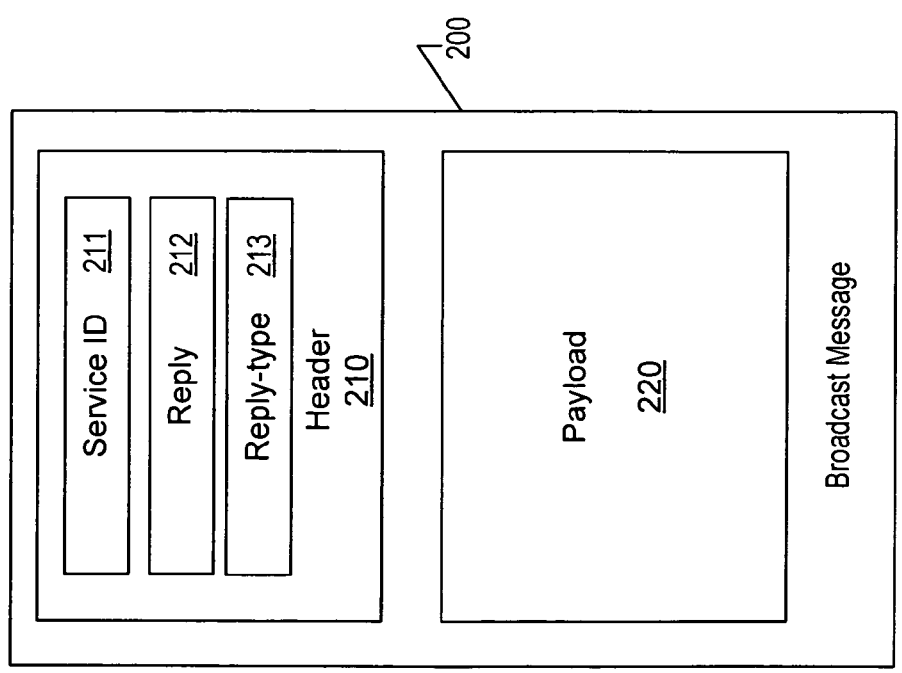
FIG. 2 is a functional block diagram generally illustrating an SMS broadcast message in accordance with one implementation of the invention.

FIG. 2 is a functional block diagram generally illustrating a broadcast message 200 in accordance with one implementation of the invention. In this implementation, the broadcast message 200 is an SMS Cell Broadcast (CB) message that enables two-way communication. It should be appreciated that although described throughout this document in terms of SMS broadcast messages, it should be appreciated that the teachings of this invention have equal applicability to any radio technology with the capability of sending one-to-many communication.

In an example and referring to FIG. 1 above, broadcast message 200 includes a payload 220 that includes data describing information to be provided to a user of a device receiving broadcast message 200. For instance, the payload may include information (e.g., text and graphics) that constitute an advertisement, a promotion, a survey, or the like. This information may even prompt for a response from the recipient.

Broadcast message 200 additionally includes a header 210 having a plurality of fields, such as fields 211, 212 and 213. The fields of the header 210 may include information for routing the message through the communication system. Certain fields within header 210 provide specific data that identifies broadcast message 200 to a recipient device (not shown) and/or provides instruction to the recipient device. For example, a service ID field (SID) 211 includes data identifying broadcast message 200 as a broadcast message, from the universe of available messages, to the receiving device.

Of particular importance is the reply field 212, which includes data describing a reply address to which a reply message may be sent. In an example, reply field 212 includes data describing a reply address associated with the data included within payload 220. For example, if the payload includes survey information, the reply field 212 may include an address to which the survey responses may be sent.

A reply-type field 213 can also be included to specify how the broadcast message 200 should be replied to. For example, a reply could take one of many forms, such as issuing a reply point-to-point message (e.g., an SMS message) to an address included in the reply field 212, initiating a voice call to a phone number included in the reply field 212, launching a browser with a URL included in the reply field 212, or the like. The reply-type field 213 could be used to specify which form the reply should take, thus allowing the receiving device to properly reply to the reply address specified in the reply field 212.

Figure 3:
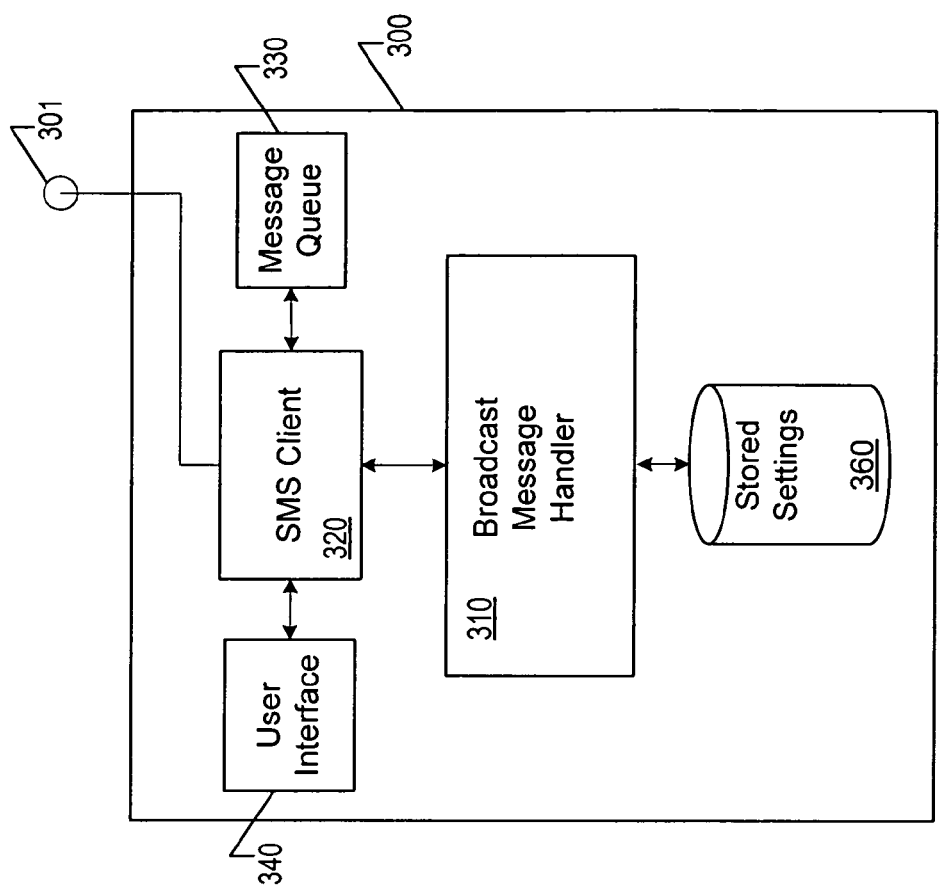
FIG. 3 is a functional block diagram generally illustrating an application execution environment in accordance with one implementation of the invention.

FIG. 3 is a functional block diagram generally illustrating an application execution environment 300 in which implementations of the invention are particularly applicable. Application execution environment 300 may be a system for executing software on a mobile device, or the like. In this embodiment, application execution environment 300 includes components to facilitate receiving and replying to broadcast messages within an SMS Cell Broadcast (CB) Service communication system.

An SMS client 320 provides general control functions for transmitting and receiving messages over a messaging transport, such as the SMS messaging protocol in common use today. The SMS client 320 may transmit and receive the messages to and from a communications component 301, and store any received messages in a message queue 330 for processing.

SMS client 320 determines a message type for each received message based on information contained within the message, such as particular headers or the like. For example, headers in a received message may identify the message as a broadcast message, a point-to-point message, or some other message type. SMS client 320 also composes messages for transmission over the messaging transport.

A user interface (U/I) 340 is a software component for formatting and presenting data to a user as well as receiving commands and input from the user. In one embodiment, the SMS client 320 formats and presents information from portions of a message (e.g., fields, payload, etc.) to a user and receives input from the user (e.g., instructions) based on the provided information using the U/I 340.

A stored settings database 360 may also be included to store persistent data, such as user preferences. For instance, the user preferences may specify whether to and which received broadcast messages to present to a user.

Broadcast message handler 310 is an engine for evaluating received broadcast messages for content and, when appropriate, generating reply messages to the received broadcast messages. Broadcast message handler 310 is in communication with SMS client 320 as well as stored settings database 360. In one embodiment, broadcast message handler 310 is notified by the SMS client 320 when broadcast messages are received. In this embodiment, broadcast message handler 310 determines whether to present the payload portion of the broadcast message to a user based on information contained within headers of the broadcast message and the user settings in the settings database 360. If the user settings allow, the broadcast message handler 310 passes the payload of the broadcast message to the U/I 340 for presentation to a user.

If a reply to the broadcast message is appropriate, the broadcast message handler 310 determines, from headers within the broadcast message, an appropriate address to which the reply should be directed. In such a case, the broadcast message handler 310 may facilitate the construction of a point-to-point message addressed to the appropriate address, and pass that reply message to the SMS client 320 for delivery using the messaging transport.

Figure 4:
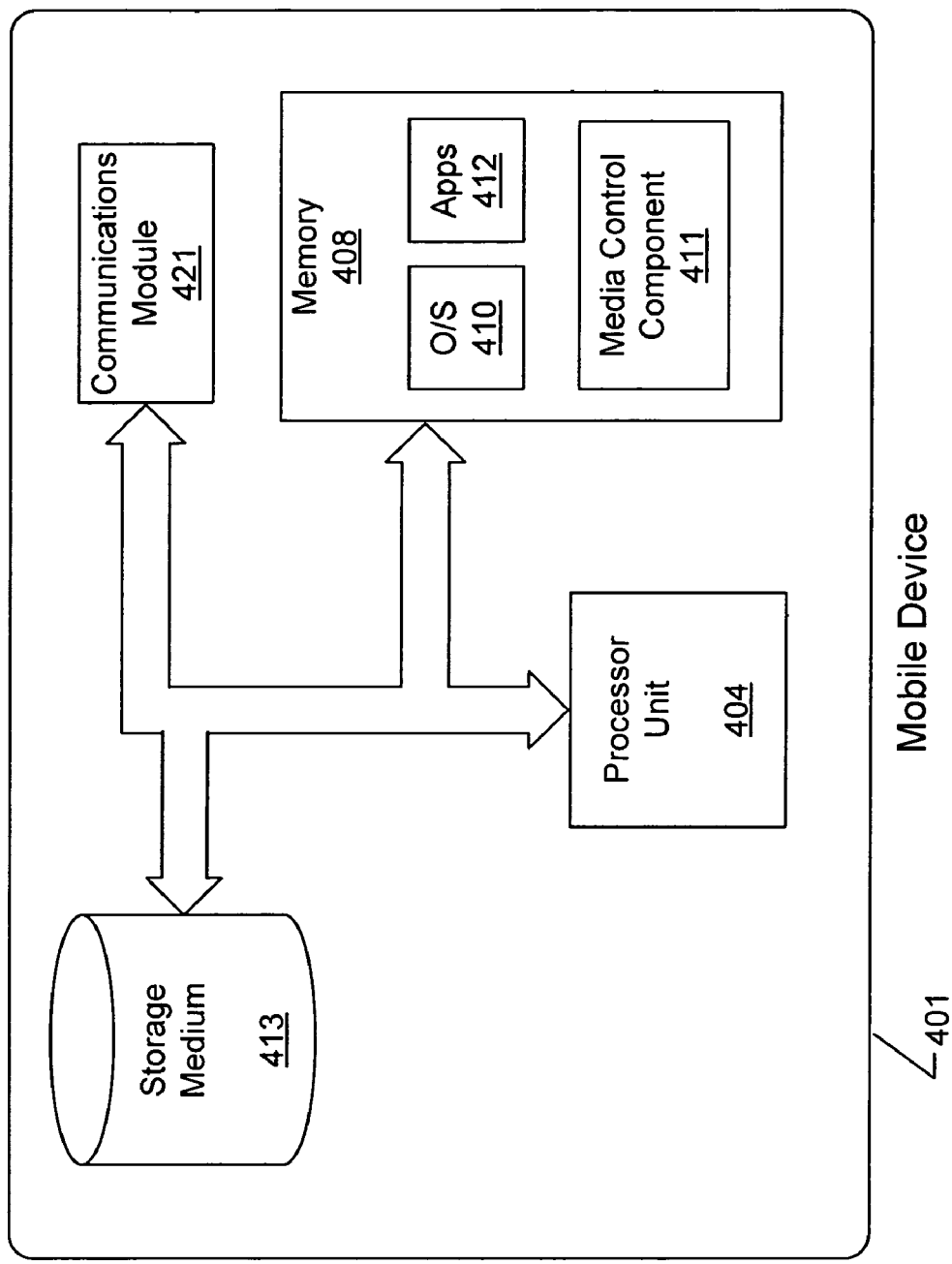
FIG. 4 is a functional block diagram generally illustrating a mobile device in which implementations of the invention are particularly applicable.

FIG. 4 is a functional block diagram generally illustrating a sample mobile device 401 in which implementations of the invention are particularly applicable. The mobile device 401 may be any handheld computing device, such as a cellular telephone, a personal digital assistant, a portable music player, a global positioning satellite (GPS) device, or the like. Although described here in the context of a handheld computing device, it should be appreciated that implementations of the invention could have equal applicability in other areas.

In this example, mobile device 401 includes a processor unit 404, a memory 408, and a storage medium 413. The processor unit 404 advantageously includes a microprocessor or a special-purpose processor such as a digital signal processor (DSP), but may in the alternative be any conventional form of processor, controller, microcontroller, or state machine. Mobile device 401 may also include additional components not relevant to the present discussion.

The processor unit 404 is coupled to the memory 408, which is advantageously implemented as RAM memory holding software instructions that are executed by the processor unit 404. In this embodiment, the software instructions stored in the memory 408 include one or more applications 412, a media control component 411, and an operating system 410. The memory 408 may be on-board RAM, or the processor unit 404 and the memory 408 could collectively reside in an Application Specific Integrated Circuit (ASIC). In an alternate embodiment, the memory 408 may be composed of firmware or flash memory, such as a SmartMedia card.

The processor unit 404 is also coupled to the storage medium 413, which may be implemented as any nonvolatile memory, such as ROM memory, flash memory, or a magnetic disk drive, just to name a few. The storage medium 413 may also be implemented as any combination of those or other technologies, such as a magnetic disk drive with cache (RAM) memory, or the like. In this particular embodiment, the storage medium 413 is used to store data during periods when the mobile device 401 may be powered off or without power.

The mobile device 401 also includes a communications module 421 that enables bidirectional communication between the mobile device 401 and one or more other computing devices. The communications module 421 may include components to enable RF or other wireless communications, such as a cellular telephone network, Bluetooth connection, wireless local or wide area network, or perhaps a Global Positioning Satellite receiver. Alternatively, the communications module 421 may include components to enable land line or hard wired network communications, such as an Ethernet connection, universal serial bus connection, IEEE 1394 (Firewire) connection, or the like. These are intended as non-exhaustive lists and many other alternatives are possible.

Figure 5:
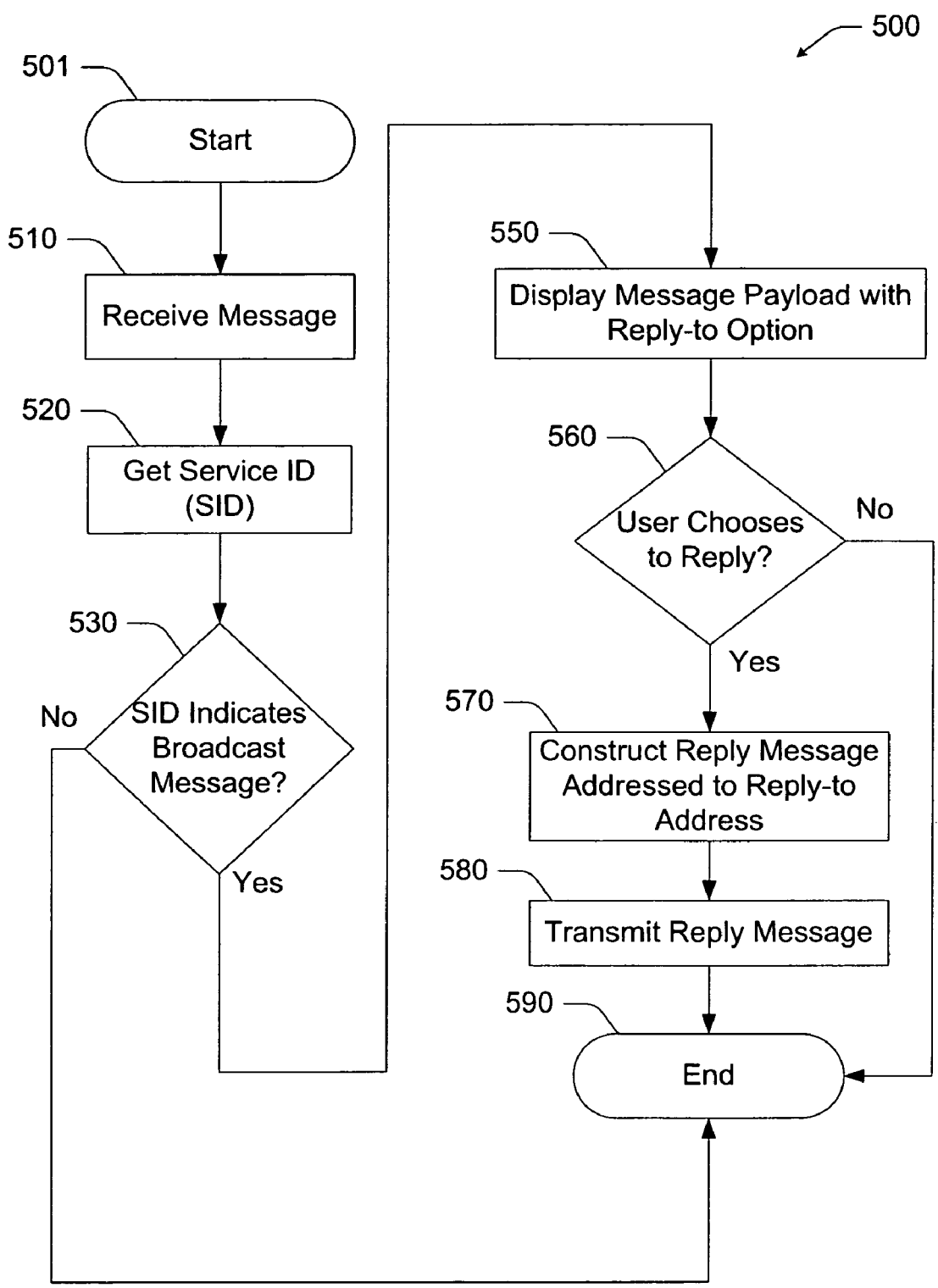
FIG. 5 is an operational flow diagram generally illustrating a process for replying to SMS cell broadcast messaging.

FIG. 5 is an operational flow diagram generally illustrating a method 500 for replying to SMS cell broadcast messaging.

In one embodiment, method 500 is implemented with components, data, and/or the exemplary operating environments of FIGS. 1-4. Although the method 500 illustrated in FIG. 5 may be described with reference to components shown in FIGS. 1-4, it should be understood that this is merely for convenience and alternative components can be employed to implement the method 500.

Preferably, one or more steps of method 500 are embodied in a computer readable medium containing computer readable code such that a series of steps are implemented when the computer readable code is executed on a computing device. In some implementations, certain steps of method 500 are combined, performed simultaneously or in a different order, or perhaps omitted, without deviating from the objective of method 500.

Method 500 begins at step 501. At step 510, it is determined that a message has been received. In one embodiment, the message is received at a mobile device within a wireless operating environment. In an example and referring to FIGS. 1 and 3 above, a message (e.g., broadcast message 150) is received at mobile device 140 from tower 111 when mobile device 140 is operating within Cell 1 (110). Continuing the example, when the message is received at the mobile device, the message is received at SMS client 320 operating within application execution environment 300.

At step 520, a service identification (SID) is retrieved from the received message. In one embodiment, each message includes a header portion and a payload portion. In this embodiment, the SID is retrieved from the header portion of the received message. In an example and referring to FIGS. 2 and 3 above, SMS client 320 retrieves the SID from the SID field 211 of header 210 within message 200.

At decision step 530, it is determined whether the SID retrieved in step 520 above indicates the received message to be a broadcast message. If it is determined that the received message is a broadcast message, the method 500 continues to step 550. If it is determined that the received message is not a broadcast message, the method 500 continues to step 590 and ends. In one embodiment, if the message is determined to be a broadcast message it is stored for further operations. In an example and referring to FIG. 3, SMS client 320 determines if the received message is a broadcast message and, if so, stores the received message in message queue 330. In this example, if the message is determined not to be a broadcast message, the message could be passed to another messaging client (not shown).

In an alternative embodiment, after the SID retrieved in step 520 above is determined to be a broadcast message, it is determined whether the retrieved SID additionally matches desired user content, such as user content defined by user settings. In an example and referring to FIG. 3 above, SMS client 320 determines if the received message is a broadcast message and stores the received message at message queue 330. Broadcast message handler 310 retrieves the broadcast message from message queue 330 as well as user settings from stored settings 360. Broadcast message handler 310 then compares the user settings to the SID and determines whether to continue with the method based on the comparison.

At step 550, the message payload that includes a reply-to option is displayed to the user. In one embodiment, a modified message payload including a reply-to option is displayed to the user via a user interface. In an example and referring to FIGS. 2 and 3 above, broadcast message handler 310 extracts the payload portion from payload 220 of broadcast message 200 as well as reply-to information from reply field 212 of broadcast message 200. Broadcast message handler 310 then passes relevant portions of the payload data and the reply-to information to user interface 340 for formatting and presentation to the user.

At decision step 560, the user chooses whether to reply to the broadcast message. If it is determined that the user intends to reply to the broadcast message, the method 500 continues to step 570. If it is determined that the user intends not to reply to the broadcast message, the method 500 continues to step 590 and ends. In one embodiment, the user communicates her intention to reply to the broadcast message via the user interface. In an example and referring to FIG. 3 above, the user communicates her intention to reply to the broadcast message to broadcast message handler 310 via user interface 340.

At step 570, a reply message addressed to the reply-to address is constructed. In one embodiment, a reply message is constructed based on user provided instruction and including the reply-to address extracted from the broadcast message in step 550. In an example and referring to FIGS. 2 and 3 above, broadcast message handler 310 produces a reply message based on instructions received from the user via user interface 340. The reply message is addressed to the reply-to address retrieved from reply field 212 of broadcast message 200 of FIG. 2 above. Continuing the example, once the reply message is constructed by message handler 310, the reply message is stored at message queue 330 to await transmission. In another embodiment, the reply message includes a header portion and a payload portion. In this embodiment, the header portion of the reply message includes the reply-to address and the payload portion of the reply message includes portions of the user input to be communicated to the reply-to address.

At step 580, the reply message is transmitted. In one embodiment, the message is transmitted from a mobile device to a reception point within the wireless operating environment. In an example and referring to FIGS. 1 and 3 above, when the message is transmitted by the mobile device, the message is passed from SMS client 320 operating within application execution environment 300 to the portion of the mobile device that propagates the message within the communication system. Continuing the example, a message (not shown) is transmitted from mobile device 140 to tower 111 when mobile device 140 is operating within Cell 1 (110) of communication system 100.

At step 590, method 500 ends.

While the present invention has been described with reference to particular embodiments and implementations, it should be understood that these are illustrative only, and that the scope of the invention is not limited to these embodiments. Many variations, modifications, additions and improvements to the embodiments described above are possible. It is contemplated that these variations, modifications, additions and improvements fall within the scope of the invention as detailed within the following claims.

We claim:

1. A method for handling broadcast messages within a communication system, comprising:
 receiving a Short Messaging Service (SMS) message at a mobile device, the SMS message including identification information identifying a message-type for the SMS message;
 determining, by examining the identification information of the received SMS message, that the received SMS message is an SMS cell broadcast message comprising a reply field and a payload field, the reply field comprising a reply-to address and a reply-type field, the payload field comprising payload information;

displaying the payload information of the payload field of the SMS cell broadcast message on a display of the mobile device;

receiving an instruction to reply to the SMS cell broadcast message;

determining a form of reply to initiate based on information in the reply-type field of the reply field of the SMS cell broadcast message; and initiating a reply responsive to the instruction to reply to the SMS cell broadcast message, the reply being directed to the reply-to address of the reply field of the SMS cell broadcast message, wherein initiating a reply comprises:

placing a voice call if the form of reply is determined to be a voice call;

generating and transmitting an SMS one-on-one message if the form of reply is determined to be a message; and connecting to a network location if the form of reply is determined to be a connection to a network location, wherein the SMS cell broadcast message is an SMS message that is broadcast over a particular cell broadcast area such that it is received by mobile devices based on their being present in the cell broadcast area.

2. The method recited in claim 1, wherein the communication system is a cellular network.

3. The method recited in claim 1, wherein the broadcast message is received using a Short Messaging Service protocol.

4. The method recited in claim 1, wherein the SMS cell broadcast message comprises a header portion, the header portion further comprising the identification information and the reply field.

5. The method recited in claim 1, wherein the reply comprises user input to be communicated to the reply-to address.

6. A method for sending a Short Messaging Service (SMS) cell broadcast message and receiving a reply to the SMS cell broadcast message within a communication system, comprising:

embedding, in an identification information field of an SMS message, information indicating the that the SMS message is an SMS cell broadcast message comprising a reply field and a payload field, the reply field comprising a reply-to address and a reply-type field, the payload field comprising payload information;

sending the SMS cell broadcast message to an area within the communication system; and receiving a reply addressed to the reply-to address of the reply field of the SMS cell broadcast message, the reply including content based on user input responsive to the payload information, wherein:

the reply is a voice call if the reply-type field indicates a voice call;

the reply is an SMS one-on-one message if the reply-type field indicates a message; and the reply is connection at a network location if the reply-type field indicates a connection to a network location.

7. The method recited in claim 6, wherein the communication system is a cellular network.

8. The method recited in claim 6, wherein sending the broadcast message is performed in accordance with a Short Messaging Service protocol.

9. The method recited in claim 6, wherein the broadcast message comprises a header portion, the header portion further comprising the message type information and the reply-to information.

10. The method recited in claim 6, wherein when the reply is a reply message comprising a header portion and a payload portion, the header portion further comprising the reply-to address and the payload portion comprising content.

11. A non-transitory storage medium having stored thereon processor-executable instructions configured to cause a processor to perform operations to reply to a broadcast message within a communication system, the operations comprising:

receiving a Short Messaging Service (SMS) message at a receiver device, the SMS message comprising identification information identifying a message-type associated with the SMS message;

determining, by examining the identification information of the received SMS message, the received SMS message is an SMS cell broadcast message comprising a reply field and a payload field, the reply field comprising a reply-to address and a reply-type field, the payload field comprising payload information;

displaying the payload information of the payload field of the SMS cell broadcast message on a display of a mobile device;

receiving an instruction to reply to the SMS cell broadcast message;

determining a form of reply to initiate based on information in the reply-type field of the reply field of the SMS cell broadcast message; and initiating a reply responsive to the instruction, the reply directed to the reply-to address, wherein initiating a reply comprises:

placing a voice call if the form of reply is determined to be a voice call;

generating and transmitting an SMS one-on-one message if the form of reply is determined to be a message; and connecting to a network location if the form of reply is determined to be a connection to a network location, wherein the SMS cell broadcast message is an SMS message that is broadcast over a particular cell broadcast area such that it is received by mobile devices based on their being present in the cell broadcast area.

12. The non-transitory storage medium of claim 11, wherein the communication system is a cellular network.

13. The non-transitory storage medium of claim 11, wherein the broadcast message comprises a header portion, the header portion of the message further comprises the identification information and the reply-to information.

14. A non-transitory storage medium having stored thereon processor-executable instructions configured to cause a processor to perform operations for sending a broadcast message and receiving a reply to the broadcast message within a communication system, the operations comprising:

embedding in an identification information field of s SMS message, information indicating the that the SMS message is an SMS cell broadcast message comprising a reply field and a payload field, the reply field comprising a reply-to address and a reply-type field, the payload field comprising payload information;

sending a signal from a communication component to a receiving device within the communication system, the signal including the SMS cell broadcast message; and receiving a reply at the communication component, the reply addressed to the reply-to address of the reply field of the SMS cell broadcast message, the reply including content based on user input responsive to the payload information such that the reply is a voice call if the reply-type field indicates a voice call;

the reply is an SMS one-on-one message if the reply-type field indicates a message; and the reply is connection at a network location if the reply-type field indicates a connection to a network location, wherein the SMS cell broadcast message is an SMS message that is broadcast over a particular cell broadcast area such that it is received by mobile devices based on their being present in the cell broadcast area.

15. The non-transitory storage medium of claim 14, wherein the communication system is a cellular network.

16. The non-transitory storage medium of claim 14, wherein the broadcast message comprises a header portion, the header portion of the message further comprises the identification information and the reply-to information.

17. The non-transitory storage medium of claim 14, wherein when the reply is a reply message comprising a header portion and a payload portion, the header portion of the reply message further comprises the reply-to address and the payload portion of the reply message further comprising portions of the user input to be communicated to the reply-to address.

18. A computer readable non-transitory storage medium encoded with computer-readable components, the components comprising:

a message queue configured for storing received Short Messaging Service (SMS) cell broadcast messages and reply messages;

an SMS engine configured to receive SMS messages and determine whether each received SMS message is an SMS cell broadcast message by determining whether a message service identifier indicating the message is an SMS cell broadcast message is associated with the SMS message, the SMS engine further configured to store the received SMS messages at the message queue when the message is an SMS cell broadcast message, the SMS engine additionally configured to retrieve reply messages from the message queue and facilitate transmission of the reply messages;

a stored settings database including user settings;

a user interface configured to format and present user information; and a broadcast message engine, the broadcast message engine configured to retrieve the stored SMS cell broadcast message and the stored user settings, the broadcast message engine further configured to determine whether to pass the user information to the user interface based on the contents of the SMS cell broadcast message and the user settings, the broadcast message engine additionally configured to receive instructions from the user interface for producing a reply based on user interaction with the user interface and the contents of the SMS cell broadcast message, the contents of the SMS cell broadcast message including a reply-type field including information for determining a form of reply and a reply field including at least a reply-to address, the broadcast message engine further configured to:

initiate a voice call if the form of reply is determined to be a voice call;

generate an SMS point-to-point reply message if the form of reply is determined to be a message and store the reply message at the message queue; and connect to a network location if the form of reply is determined to be a connection to a network location.

19. An apparatus for handling broadcast messages within a communication system, comprising:

means for receiving a Short Messaging Service (SMS) message at a mobile device, the SMS message including identification information identifying a message-type for the SMS message;

means for determining, by examining the identification information of the received SMS message, that the received SMS message is a broadcast message comprising a reply field and a payload field, the reply field comprising a reply-to address and a reply-type field, the payload field comprising payload information;

means for displaying the payload information of the payload field of the SMS cell broadcast message on a display of the mobile device;

means for receiving an instruction to reply to the SMS cell broadcast message;

means for determining a form of reply to initiate based on information in the reply-type field of the reply field of the SMS cell broadcast message; and means for initiating a reply responsive to the instruction to reply to the SMS cell broadcast message, the reply being directed to the reply-to address of the reply field of the SMS cell broadcast message, wherein means for initializing a reply further comprises:

means for placing a voice call if the form of reply is determined to be a voice call;

means for generating and transmitting a message if the form of reply is determined to be an SMS one-on-one message; and means for connecting to a network location if the form of reply is determined to be a connection to a network location, wherein the SMS cell broadcast message is an SMS message that is broadcast over a particular cell broadcast area such that it is received by mobile devices based on their being present in the cell broadcast area.

20. An apparatus for sending a Short Messaging Service (SMS) cell broadcast message and receiving a reply to the SMS cell broadcast message within a communication system, comprising:

means for embedding in an identification information field of an SMS message, information indicating the that the SMS message is an SMS cell broadcast message comprising a reply field and a payload field, the reply field comprising a reply-to address and a reply-type field, the payload field comprising payload information;

means for sending the SMS cell broadcast message to a mobile device within the communication system; and means for receiving a reply addressed to the reply-to address, the reply including content based on user input responsive to the user information, wherein means for receiving a reply comprises:

means for receiving a voice call if the reply-type field indicates a voice call;

means for receiving an SMS one-on-one message if the reply-type field indicates a message; and means for receiving connection at a network location if the reply-type field indicates a connection to a network location, wherein the SMS cell broadcast message is an SMS message that is broadcast over a particular cell broadcast area such that it is received by mobile devices based on their being present in the cell broadcast area.

* * * * *